United States Patent Office 2,873,239
Patented Feb. 10, 1959

2,873,239
PROCESS FOR MAKING 2-MERCAPTOETHYL ETHERS OF DIOLS

William R. Nummy and Giffin D. Jones, Midland, Mich., assignors to The Dow Chemical Company, Midland, Mich., a corporation of Delaware No Drawing. Application April 23, 1956
Serial No. 579,772

8 Claims. (Cl. 204—158)

This invention concerns a process for making 2-mercaptoethyl ethers of diols. It relates more particularly to a process and certain sensitizing agents for effecting the abnormal addition of hydrogen sulfide to vinyl ethers of diols under the influence of light to form the corresponding 2-mercaptoethyl ethers of diols, e. g. di(2-mercaptoethyl) ether of diethylene glycol.

U. S. Patent No. 2,411,983 makes mercaptans by effecting the abnormal addition of hydrogen sulfide to olefins with light of wave lengths above 3000 Angstrom units in the presence of a carboxylic compound selected from the class consisting of ketones, aldehydes and acid halides as catalysts or reaction sensitizers. The patent teaches that unsaturated organic compounds which may be treated according to the process include hydrocarbons containing olefinic or acetylenic linkages or substituted hydrocarbons such as vinyl halides, crotyl halides, methallyl halides and the like, or methyl methacrylate, divinyl ether, dialkyl ether, dimethallyl ether and the like.

It is an object of the invention to provide a process and sensitizing agents for catalytically effecting the abnormal addition of hydrogen sulfide to vinyl ethers of diols under the influence of light to form the corresponding 2-mercaptoethyl ethers of the diols. Another object is to provide a process for making 2-mercaptoethyl ethers of glycols and polyglycols from vinyl ethers of glycols and polyglycols and hydrogen sulfide. Other and related objects may appear from the following description of the invention.

According to the invention the abnormal addition of hydrogen sulfide to vinyl ethers of diols can readily be carried out under the influence of light of wave lengths above 3000 Angstrom units, consisting predominantly of wave lengths between 3000 and 4000 Angstrom units, and in the presence of an aromatic compound selected from the group consisting of anthracene, fluorene, polyvinyl aromatic hydrocarbons of the benzene series and nuclear polychlorinated monovinyl aromatic hydrocarbons of the benzene series, to form the corresponding 2-mercaptoethyl ethers of diols in good yield, as hereinafter described.

The vinyl ethers of diols which may be treated according to the process to yield the corresponding 2-mercaptoethyl ethers are the mono- and divinyl ethers of alkane diols or glycols such as ethylene glycol, 1,2-propylene glycol, 1,2-butylene glycol, 2,3-butylene glycol, 1,3-propanediol, 1,4-butanediol or mono- and divinyl ethers of polyglycols. Suitable mono- and divinyl ethers of diols are those having the general formula

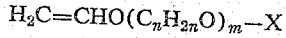

$$H_2C=CHO(C_nH_{2n}O)_m-X$$

wherein X represents a member of the group consisting of hydrogen and the vinyl radical, n is an integer from 2 to 4 and m is an integer from 1 to 4.

The sensitizing agents for initiating or catalyzing the abnormal addition reaction of the hydrogen sulfide with vinyl ethers embraced by the above formula under the influence of light of wave lengths above 3000 Angstrom units, preferably light of wave lengths between 3000 and 4000 Angstrom units, are aromatic compounds which are capable of absorbing light of such wave lengths and are dissociated under the influence of the light to yield free radicals. Examples of suitable organic compounds which can be employed as sensitizing agents or catalysts in the process are anthracene, fluorene, polyvinyl aromatic hydrocarbons such as divinylbenzene, divinyltoluene, divinylxylene or trivinylbenzene or nuclear polychlorinated monovinyl aromatic hydrocarbons, e. g. dichlorostyrene, trichlorostyrene, tetrachlorostyrene, or pentachlorostyrene. The sensitizing agents are employed in amounts corresponding to from 0.01 to 5, preferably from 0.1 to 1, percent by weight of the vinyl ether of diol starting material used.

The reaction can be carried out at temperatures between −20° and 50° C., and under a pressure at least as great as the autogeneous pressure of the reactants, suitably a pressure sufficient to maintain the hydrogen sulfide substantially in liquid condition. Pressures of from 100 to 600 pounds per square inch absolute pressure are satisfactory, but higher pressures can be used.

The reaction can be carried out batchwise or in continuous manner. In carrying out the process industrially, it is convenient to employ a pressure-resistant reaction vessel fitted with a stirrer and means for heating or cooling the contents of the vessel. The vessel should be provided with a well formed of a transparent pressure-resistant light-transmissive material such as Pyrex glass or quartz to permit irradiation of the contents of the reaction vessel by means of a suitable light source, e. g. light emitted from an ordinary tungsten filament electric lamp or a mercury vapor lamp, of wave lengths which are above or predominantly above 3000 Angstrom units, preferably of wave lengths between 3000 and 4000 Angstrom units. The reaction can be carried out in continuous manner by feeding the vinyl ether of a diol starting material, together with one or more of the sensitizing agents in the desired proportions, and hydrogen sulfide to a reaction zone substantially filled with a liquid material comprising the reactants, the sensitizing agents and the 2-mercaptoethyl ether product being formed and exposed to actinic radiation, in the presence of said sensitizing agent, sufficient to catalyze the reaction and continuously withdrawing liquid material from said reaction zone. The hydrogen sulfide is usually employed in greater than stoichiometric quantities, suitably in amounts of from two to ten times the stoichiometric proportion. Upon completing the reaction the unreacted hydrogen sulfide is recovered and re-employed in the process or subsequent reactions. The product is recovered in usual ways, e. g. by distillation.

The following examples illustrate ways in which the principle of the invention has been applied, but are not to be construed as limiting its scope.

Example 1

A charge of 10 grams of divinylether of diethylene glycol, together with 0.1 gram of 2,5-dichlorostyrene as sensitizing agent, was placed in a 1-inch diameter Pyrex glass tube. Nitrogen gas was bubbled slowly through the mixture for a period of 10 minutes. The tube and its contents were cooled to about −70° C. in a Dry Ice bath. Hydrogen sulfide gas was added and condensed until the mixture contained about 10 cc. of liquid $H_2S$. Thereafter, the tube was sealed. The tube and its contents were allowed to warm to room temperature. The tube and its contents at temperatures between 0° and 5° C. were exposed to rays from an S–4 Sunlamp (General Electric Company) placed at a distance of 4½ inches from the tube, for a period of 30 minutes. Thereafter, the tube and its contents were cooled in a Dry Ice bath. The tube was opened and the contents removed. Unreacted hydrogen sulfide was separated by bubbling nitrogen gas through the product until a moistened lead acetate test paper held in the vent gas stream gave a negative test for H₂S. The liquid product was analyzed and found to consist of 2,2′-oxybis-(ethyleneoxy)diethanethiol. The yield of said product was 85 percent, based on the divinyl ether of diethylene glycol initially used.

In a similar experiment, employing 0.01 gram of the 2,5-dichlorostyrene as sensitizing agent, the 2,2′-oxybis-(ethyleneoxy)diethanethiol was obtained in a yield of 77.5 percent, based on the divinyl ether of diethylene glycol initially used.

In contrast, only trace amounts of 2,2′-oxybis-(ethyleneoxy)diethanethiol are obtained when attempt is made to carry out the above reaction in the absence of a sensitizing agent under otherwise similar conditions.

*Example 2*

A charge of 10 grams of divinyl ether of diethylene glycol, together with 0.1 gram of fluorene as sensitizing agent, was placed in a 1-inch diameter Pyrex glass tube 4 inches long. Nitrogen gas was bubbled slowly through the mixture for a period of 10 minutes. It was cooled to a temperature of −70° C. in a Dry Ice bath. Hyrogen sulfide gas was added and condensed until the mixture contained between 10 and 15 cc. of liquid hydrogen sulfide. Thereafter, the tube was sealed and allowed to warm to room temperature. The tube and its contents were exposed to rays from an S–4 Sunlamp placed at a distance of 4½ inches from the tube, for a period of 30 minutes, at temperatures between 0° and 5° C. Thereafter, the tube and its contents were cooled in a Dry Ice bath. The tube was opened and the contents removed. The 2,2′-oxybis-(ethyleneoxy)diethanethiol product was recovered by procedure similar to that employed in Example 1. The yield of said product was 87 percent based on the divinyl ether of diethylene glycol initially used.

*Example 3*

A charge of 10 grams of divinyl ether of diethylene glycol was reacted with hydrogen sulfide in the presence of 0.1 gram of divinylbenzene as sensitizing agent, employing procedure similar to that employed in Example 1. The yield of 2,2′-oxybis-(ethyleneoxy)diethanethiol was 78 percent based on the divinyl ether of diethylene glycol initially used.

*Example 4*

A charge of 10 grams of divinyl ether of diethylene glycol was reacted with hydrogen sulfide in the presence of 0.1 gram of anthracene as sensitizing agent, employing procedure similar to that employed in Example 1. The yield of 2,2′-oxybis-(ethyleneoxy)diethanethiol was 60 percent, based on the divinyl ether of diethylene glycol initially used.

We claim:

1. A process for effecting the abnormal addition of hydrogen sulfide to a vinyl ether of a diol, which comprises reacting a vinyl ether of a diol having the general formula:

$$H_2C=CHO(C_nH_{2n}O)_m-X$$

wherein X represents a member of the group consisting of hydrogen and the vinyl radical, $n$ is an integer from 2 to 4 and $m$ is an integer from 1 to 4, with hydrogen sulfide at temperatures between −20° and 50° C. in the presence of a sensitizing agent consisting of at least one aromatic compound selected from the group consisting of anthracene, fluorene, polyvinyl aromatic hydrocarbons of the benzene series and nuclear polychlorinated monovinyl aromatic hydrocarbons of the benzene series, in amount corresponding to from 0.01 to 5 percent based on the weight of the vinyl ether starting material, and effecting the reaction under the influence of light consisting predominantly of wave lengths between 3000 and 4000 Angstrom units.

2. A process as claimed in claim 1, wherein the sensitizing agent is a polyvinyl aromatic hydrocarbon of the benzene series.

3. A process as claimed in claim 2, wherein the sensitizing agent is divinylbenzene.

4. A process as claimed in claim 1, wherein the sensitizing agent is a nuclear polychlorinated monovinyl aromatic hydrocarbon of the benzene series.

5. A process as claimed in claim 4, wherein the sensitizing agent is 2,5-dichlorostyrene.

6. A process as claimed in claim 1, wherein the vinyl ether of a diol is divinyl ether of diethylene glycol.

7. A process as claimed in claim 1, wherein the sensitizing agent is anthracene.

8. A process as claimed in claim 1, wherein the sensitizing agent is fluorene.

References Cited in the file of this patent

UNITED STATES PATENTS

| | | |
|---|---|---|
| 2,398,479 | Vaughan et al. | Apr. 16, 1946 |
| 2,411,983 | Vaughan et al. | Dec. 3, 1946 |